US008678669B2

(12) United States Patent
Lee

(10) Patent No.: US 8,678,669 B2
(45) Date of Patent: Mar. 25, 2014

(54) RECONFIGURABLE POLARITY DETACHABLE CONNECTOR ASSEMBLY

(75) Inventor: Jhih-Ping Lee, New Taipei (TW)

(73) Assignee: Alliance Fiber Optic Products Co., Ltd., New Taipei (TW)

( * ) Notice: Subject to any disclaimer, the term of this patent is extended or adjusted under 35 U.S.C. 154(b) by 59 days.

(21) Appl. No.: 13/584,856

(22) Filed: Aug. 14, 2012

(65) Prior Publication Data

US 2014/0050443 A1    Feb. 20, 2014

(51) Int. Cl.
- *H01R 24/84*    (2011.01)
- *H01B 13/28*    (2006.01)
- *H01R 13/659*   (2011.01)

(52) U.S. Cl.
USPC ............... 385/77; 385/88; 385/59; 385/92; 439/67; 257/E23.177; 398/21; 398/193; 398/200

(58) Field of Classification Search
CPC ........ G02B 6/4403; G02B 6/448; G02B 6/00; G02B 6/3806; G02B 6/3807; G02B 6/3879; G02B 6/3869; G02B 6/3897
USPC ........... 385/88, 59, 92; 257/E23.177; 398/21; 398/193, 200
See application file for complete search history.

(56) References Cited

U.S. PATENT DOCUMENTS

| | | | | |
|---|---|---|---|---|
| 4,762,388 | A * | 8/1988 | Tanaka et al. | 385/58 |
| 7,234,876 | B2 * | 6/2007 | Ohtsu et al. | 385/59 |
| 2004/0002236 | A1 * | 1/2004 | Norman et al. | 439/67 |
| 2005/0271328 | A1 * | 12/2005 | Ohtsu et al. | 385/59 |
| 2006/0072892 | A1 * | 4/2006 | Serrander et al. | 385/135 |
| 2011/0299814 | A1 * | 12/2011 | Nakagawa | 385/78 |
| 2012/0039569 | A1 * | 2/2012 | Kevern et al. | 385/56 |

* cited by examiner

Primary Examiner — Kaveh Kianni
(74) Attorney, Agent, or Firm — Bacon & Thomas, PLLC

(57) ABSTRACT

A reconfigurable polarity detachable connector assembly includes a housing defining two accommodation channels and providing a springy protruding member at a top side, two mating simplex connectors respectively detachably mounted in the accommodation channels of the housing, a fiber optic cable fastened to the housing with two optical fiber cores thereof respectively inserted into respective calibration support rods of the mating simplex connectors, and a sliding cap slidably coupled to the housing. The sliding cap is unlocked and can be moved backwardly relative to the housing to expose the optical fiber cores of the fiber optic cable to the outside of the housing for allowing position exchange between the two mating simplex connectors after the user presses the springy protruding member.

12 Claims, 12 Drawing Sheets

RECONFIGURABLE POLARITY DETACHABLE CONNECTOR ASSEMBLY

BACKGROUND OF THE INVENTION

1. Field of the Invention

The present invention is electrical signal connectors and more particularly to a reconfigurable polarity detachable connector assembly, which allows position exchange between two mating simplex connectors after the user pressed a springy protruding member of the housing thereof acid moved a sliding cap backwardly relative to the housing and the connected fiber optic cable.

2. Description of the Related Art

With the progress of communication technology, especially in the fields of internet and computer service, the distance between people around the world has indeed been shortened. The establishment of telephone network and internet related technology makes communication across the globe easier, quicker and more reliable. In telecommunication systems and networks, cables are used to transmit electric or optical signals. Nowadays, fiber optic cables are intensively used to substitute for conventional coaxial cables for transmitting signals for the advantages of strong resistance to electromagnetic noises, high bandwidth, light weight, long signal transmission distance and high confidentiality.

Furthermore, the small form of fiber optic connectors are divided into six types, including VF-45, MT-RJ, LC, MPO, MU and E2000. Among these six types, MPO, MU and LC are mostly commonly accepted. A LC type fiber optic connector is a duplex connector incorporates two round ferrules with outer diameters of 1.25 mm and a duplex pitch of 6.25 mm, having the flexibility of simplex and duplex.

Further, a duplex connector comprises two channels. In actual practice, the two channels of a duplex connector may have to be exchanged for changing data transmission channels. FIG. 12 illustrates a conventional duplex connector. According to this design, the duplex connector comprises a housing A, two simplex connectors B, and a fiber optic cable C. The housing A comprises a rear mounting portion A1, two connector channels A2, and a retaining hook A21 disposed in each connector channels A2. Each simplex connector B comprises a hollow holder base B1, a tubular calibration support rod B2, a spring member B3 and a connection sleeve B4. The connection sleeves B4 of the two simplex connectors B are respectively mounted in the connector channels A2, each having a retaining groove B41 forced into engagement with the retaining hook A21 in the respective connector channel A2. The fiber optic cable C is fastened to the mounting portion A1 of the housing A with an outside jacket D and a ferrule E, having two optical fiber cores C1 thereof respectively inserted into the tubular calibration support rods B2 of the simplex connectors B in the connector channels A2.

According to the aforesaid design, the housing A is formed of a first shell member A3 and a second shell member A4. The first shell member A3 comprises two hook rods A31 respectively disposed at the left front side and right rear side, and two retaining grooves A32 respectively disposed at the left rear side and right front side. The second shell member A4 comprises two hook rods A41 respectively disposed at the left rear side and right front side, and two retaining grooves A42 respectively disposed at the left front side and right rear side. During installation, the hook rods A31 and retaining grooves A32 of the first shell member A3 are respectively forced into engagement with the retaining grooves A42 and hook rods A41 of the second shell member A4. When going to detach the first shell member A3 and the second shell member A4, the respective hook rods A31;A41 must be disengaged from the respective retaining grooves A42;A32. However, it is difficult to simultaneously disengage the hook rods A31 of the first shell member A3 from the retaining grooves A42 of the second shell member A4 and the hook rods A41 of the second shell member A4 from the retaining grooves A32 of the first shell member A3 for position exchange between the two simplex connectors A.

SUMMARY OF THE INVENTION

The present invention has been accomplished under the circumstances in view. It is therefore the main object of the present invention to provide a reconfigurable polarity detachable connector assembly, which allows position exchange between two simplex connectors thereof.

To achieve this and other objects of the present invention, a reconfigurable polarity detachable connector assembly comprises a housing, two mating simplex connectors, a fiber optic cable, and a sliding cap. The housing comprises two accommodation channels arranged in parallel at the front side, two sliding grooves bilaterally disposed at the bottom side, an opening disposed at the top side, and a springy protruding member suspending in the opening and partially protruding over the top side of the housing. The two mating simplex connectors are respectively detachably mounted in the accommodation channels of the housing, each comprising a hollow holder base, a tubular calibration support rod positioned in the hollow holder base, and a connection sleeve fastened to the rear side of the hollow holder base around the tubular calibration support rod and detachably mountable in one accommodation channel of the housing. The fiber optic cable is fastened to the housing, comprising two optical fiber cores respectively inserted into the connection sleeves of the mating simplex connectors into the respective tubular calibration support rods. The sliding cap is capped on the housing and stopped at the front side of the springy protruding member, comprising two sliding rails respectively slidably coupled to the sliding grooves of the housing, and a stop flange disposed at the front side and stoppable against the springy protruding member of the housing. The sliding cap can be moved relative to the housing to expose the optical fiber cores of the fiber optic cable to the outside of the housing for allowing position exchange between the mating simplex connectors after the user presses the springy protruding member into the opening to unlock the sliding cap from the housing.

Further, the housing comprises two locating grooves respectively disposed at two opposite lateral sides and respectively outwardly extended from the accommodation channels in a perpendicular manner for the positioning of the mating simplex connectors during positioning exchange. Further, the connection sleeve of each mating simplex connector is marked with an index that can be a letter, numeral, or symbol.

Further, the stop flange of the sliding cap comprises two arched surface portions respectively abutted against the periphery of the connection sleeves of the mating simplex connectors to prohibit the connection sleeves of the mating simplex connectors from transverse displacement relative to the housing.

DETAILED DESCRIPTION OF THE PREFERRED EMBODIMENT

Figure 1:
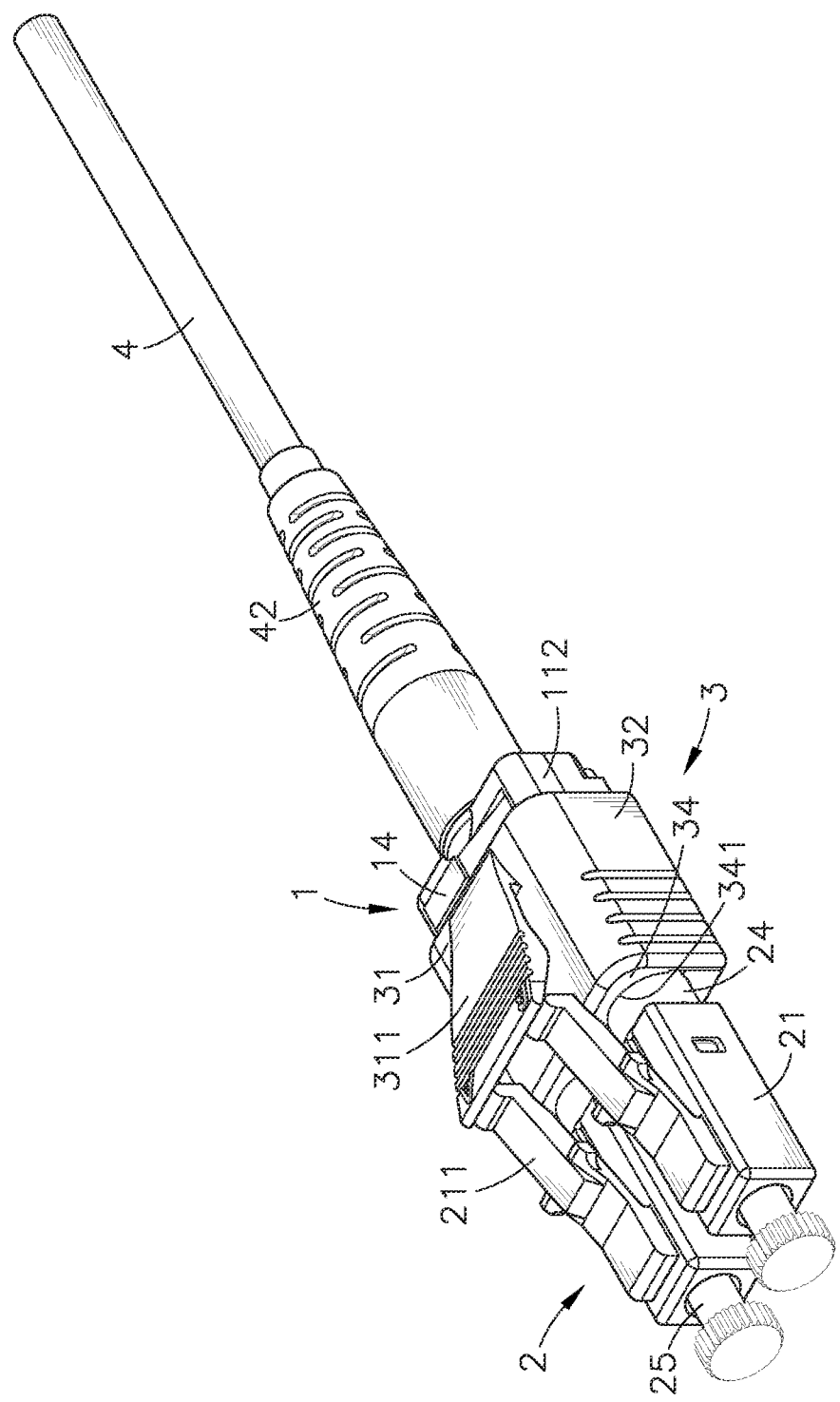
FIG. 1 is an oblique elevational view of a reconfigurable polarity detachable connector assembly in accordance with the present invention.
Figure 2:
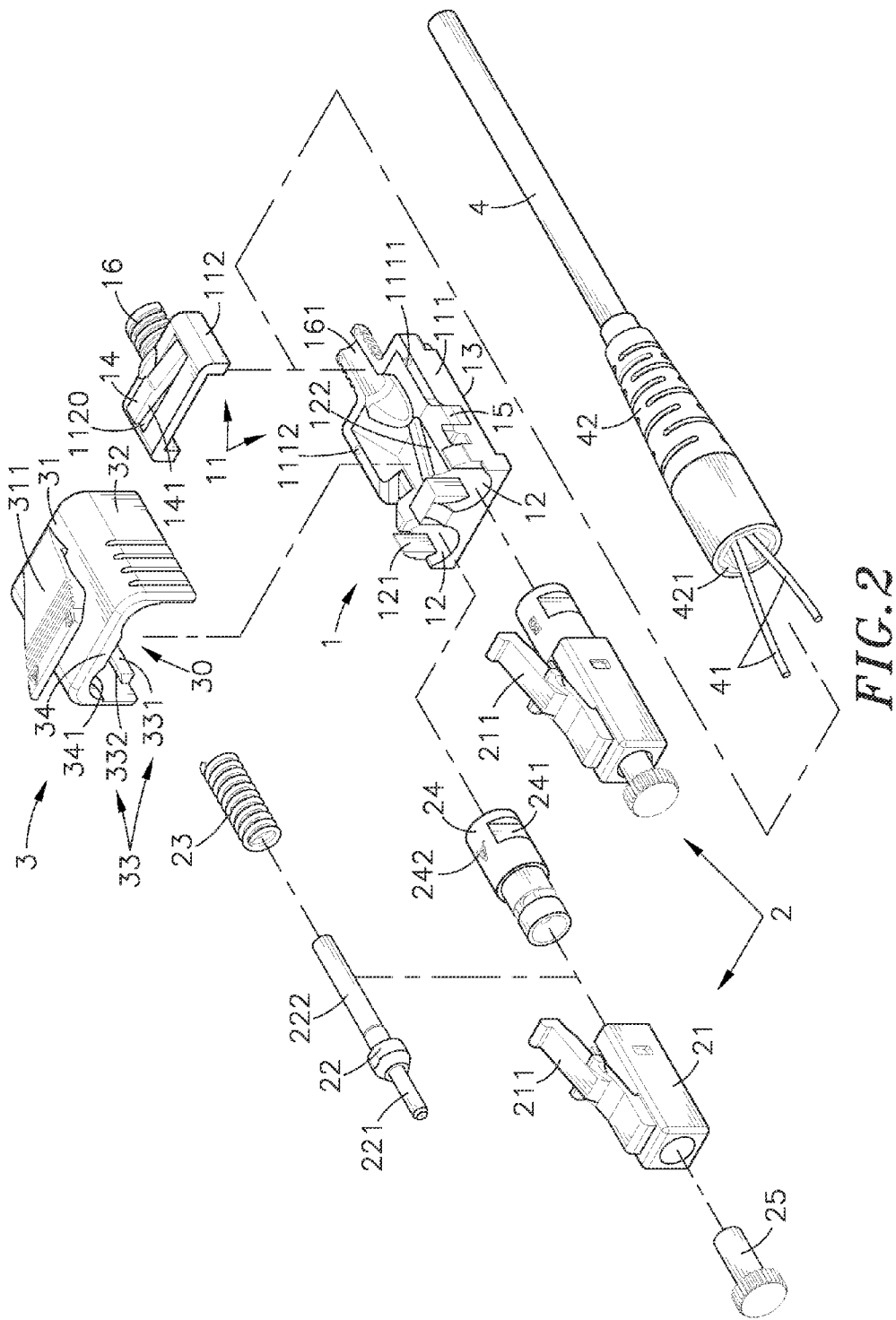
FIG. 2 is an exploded view of the reconfigurable polarity detachable connector assembly in accordance with the present invention.
Figure 3:
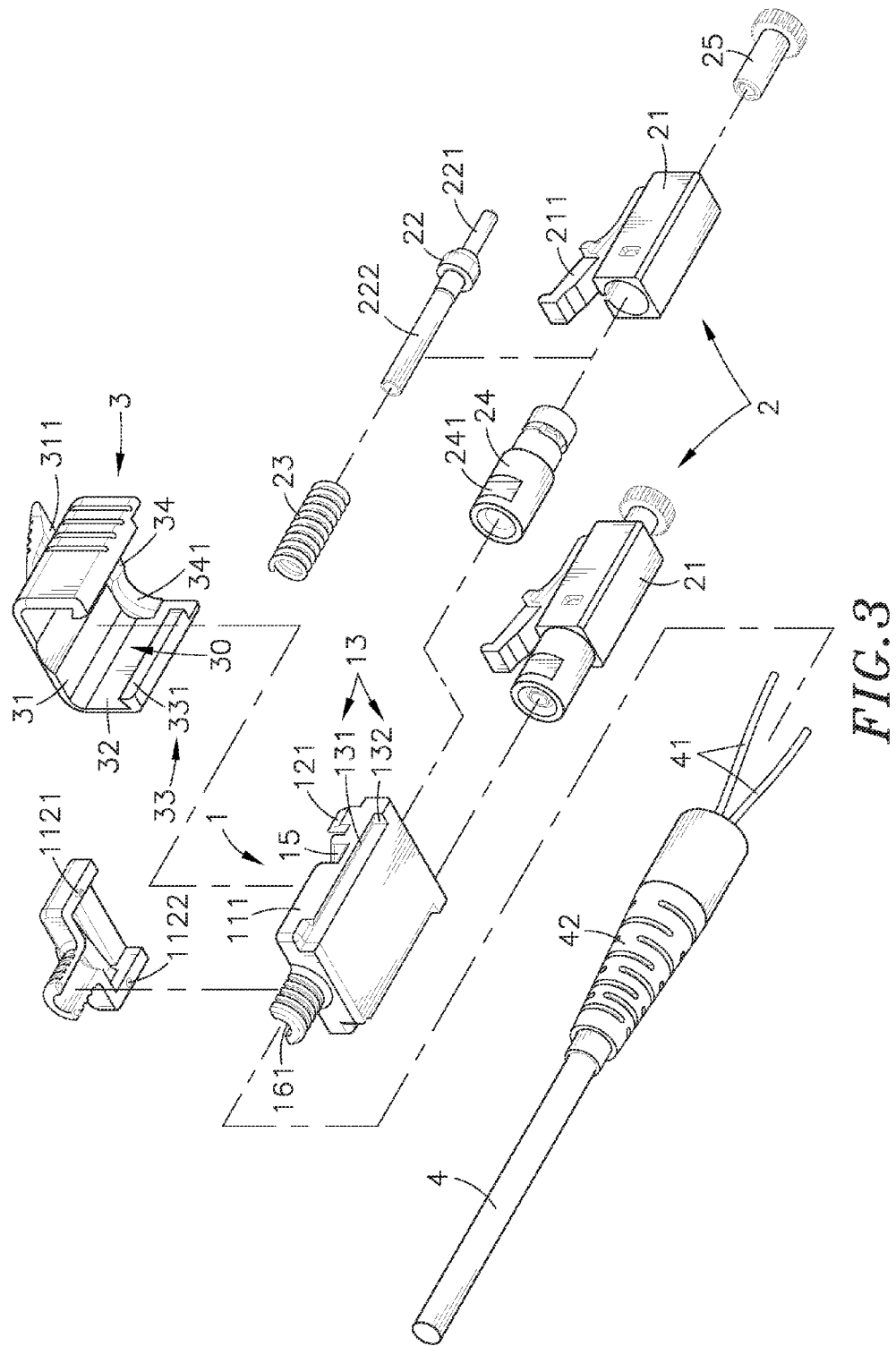
FIG. 3 corresponds to FIG. 2 when viewed from another angle.
Figure 4:
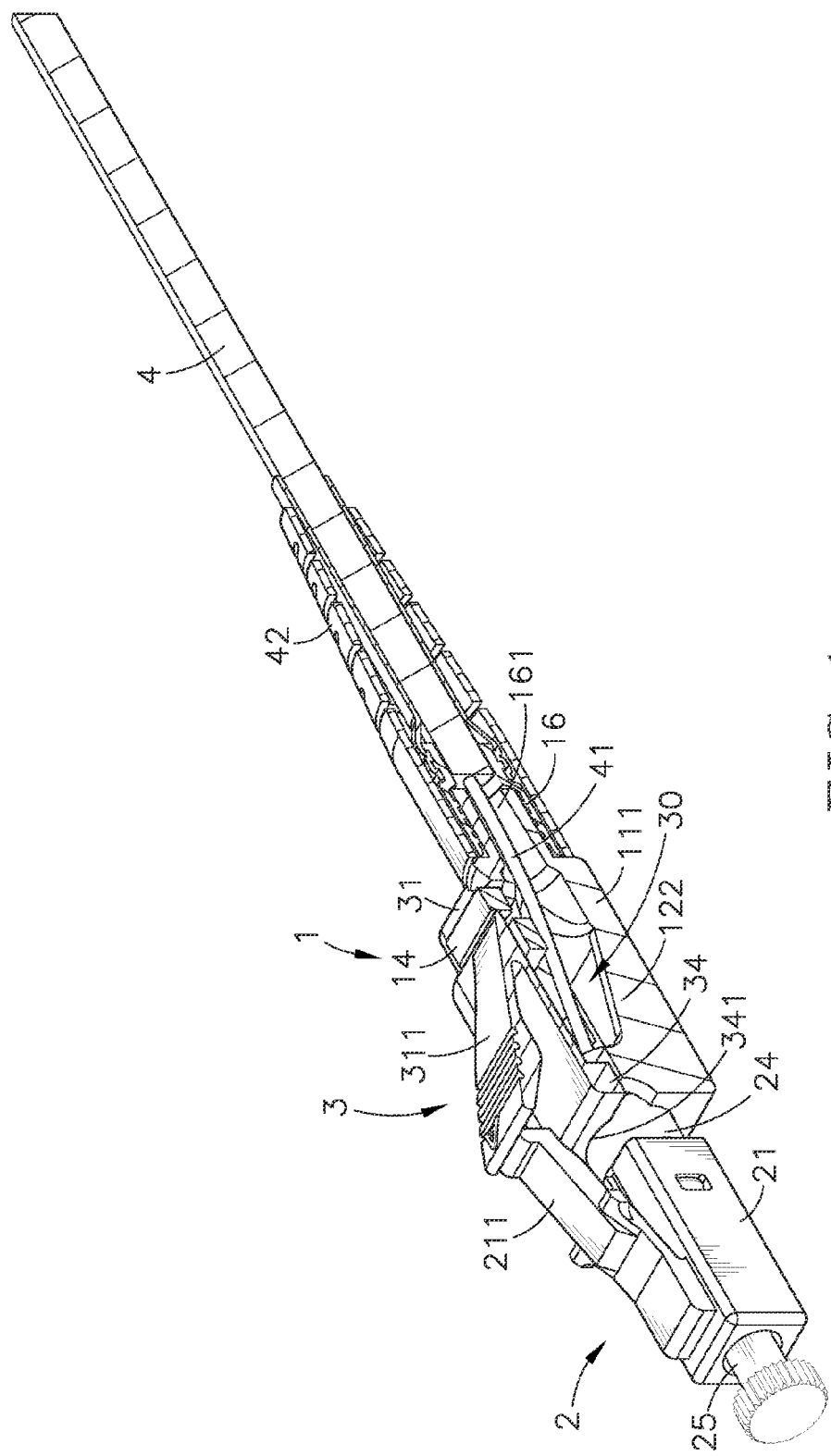
FIG. 4 is a sectional elevation of the reconfigurable polarity detachable connector assembly in accordance with the present invention.
Figure 5:
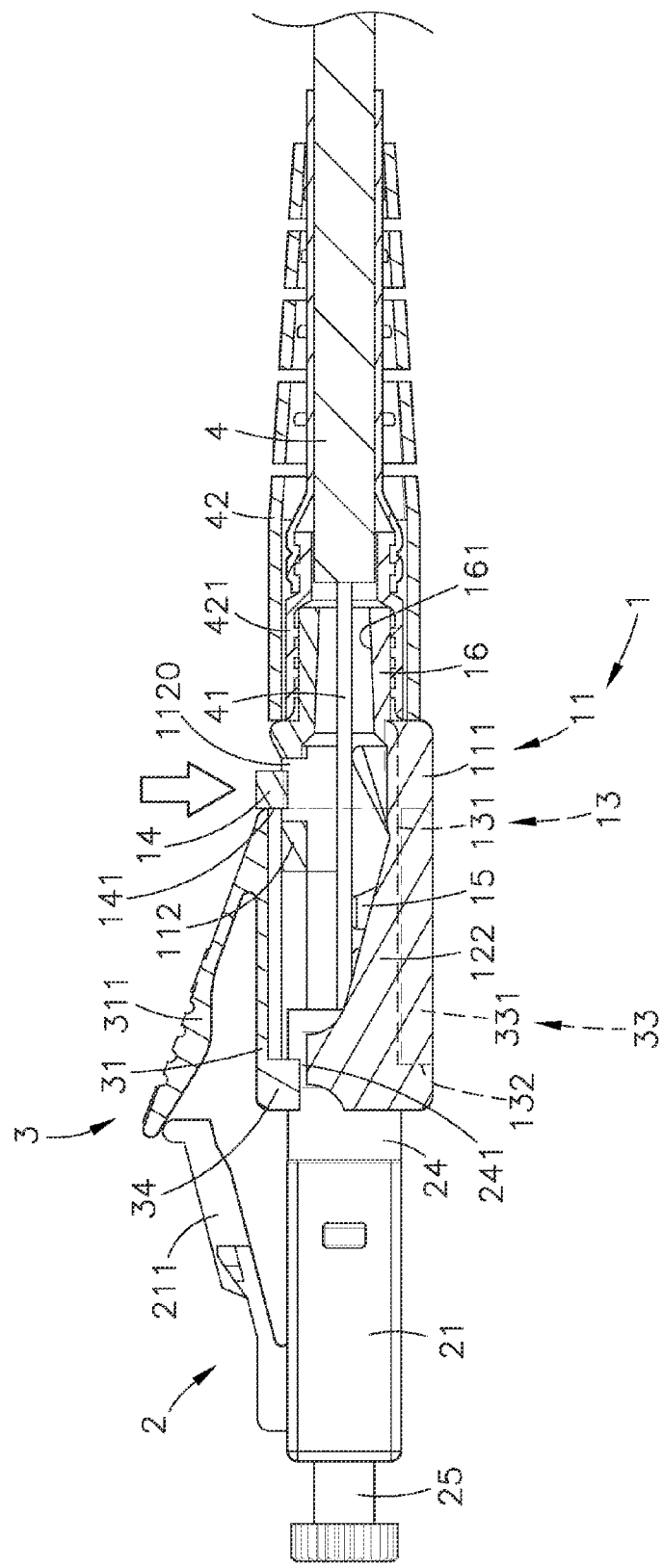
FIG. 5 is a schematic sectional view of the present invention, illustrating an external downward pressure applied to the springy protruding member of the housing.
Figure 6:
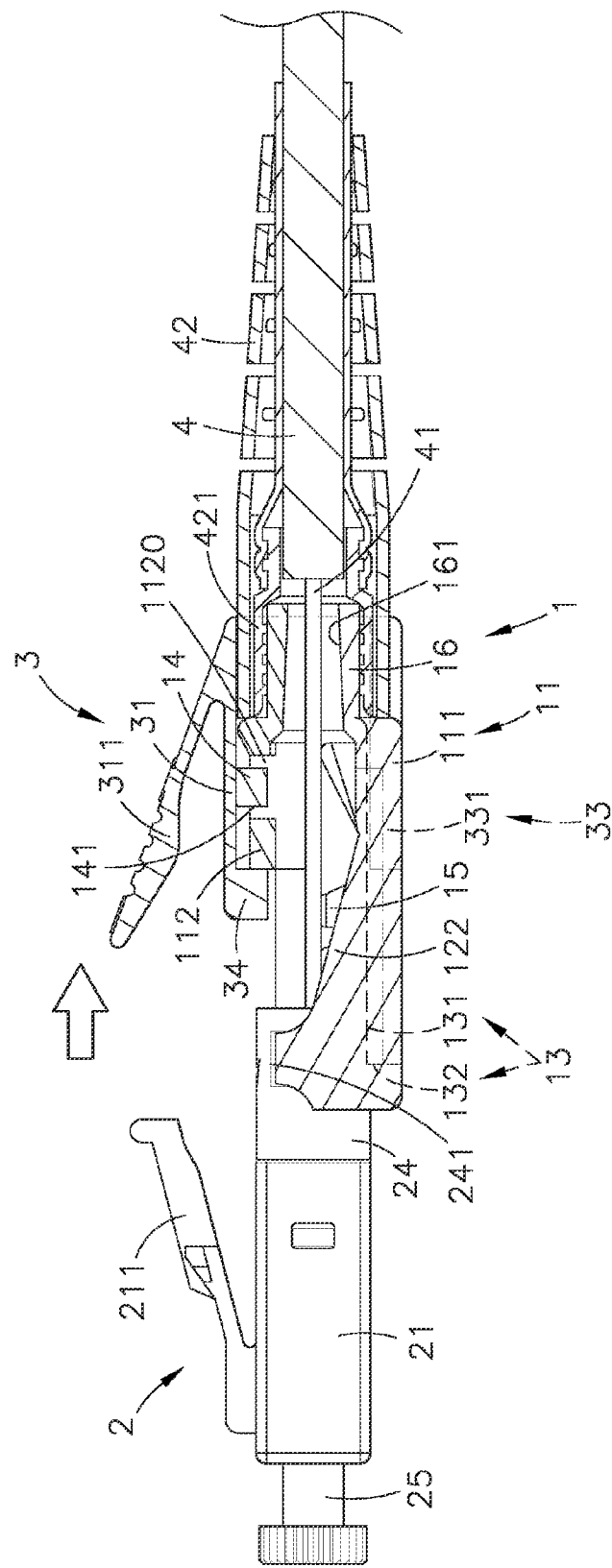
FIG. 6 corresponds to FIG. 5, illustrating the sliding cap moved backwards relative to the housing.
Figure 7:
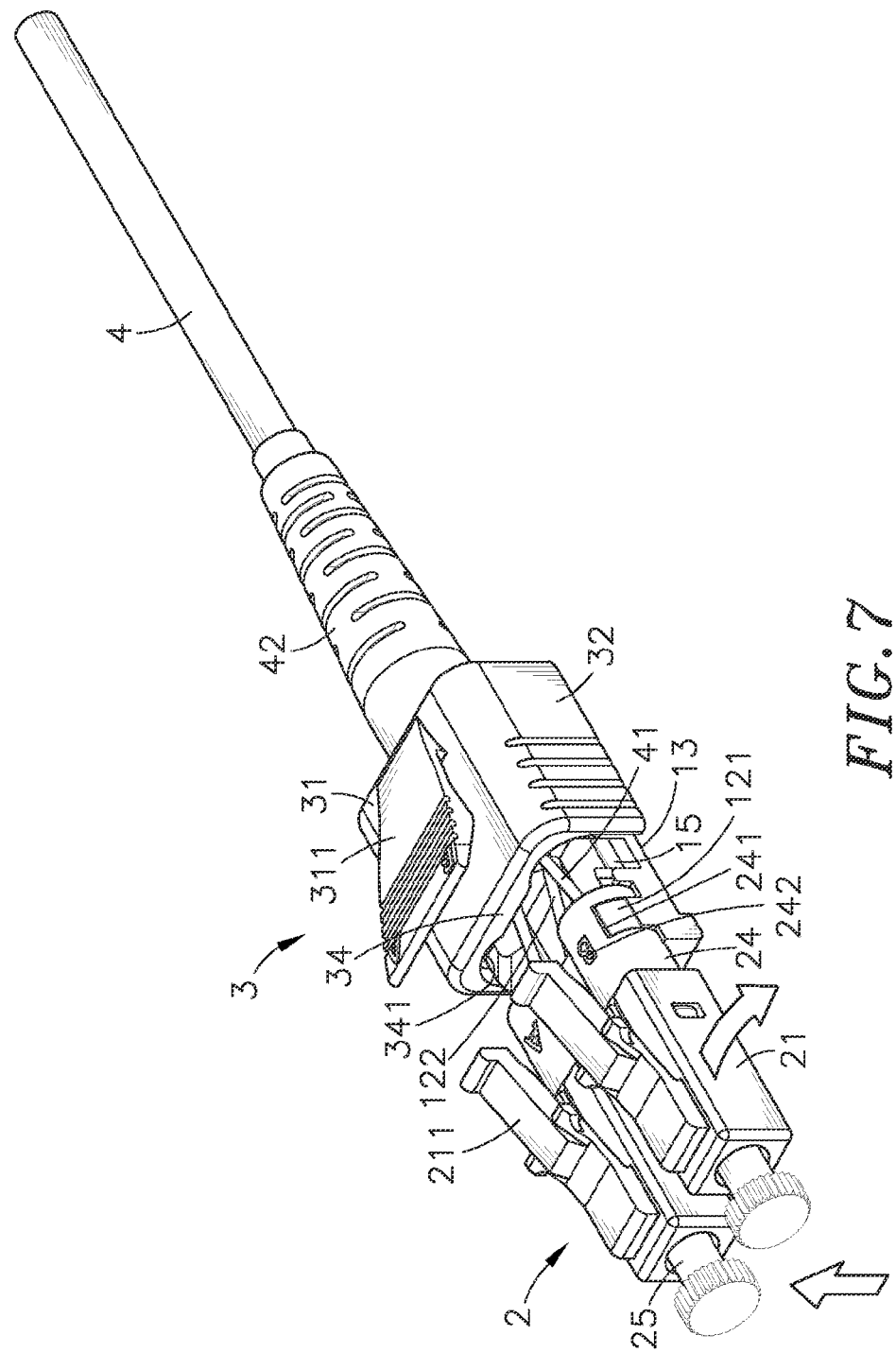
FIG. 7 is a schematic drawing illustrating exchange between the simplex connectors of the reconfigurable polarity detachable connector assembly in accordance with the present invention (I).
Figure 8:
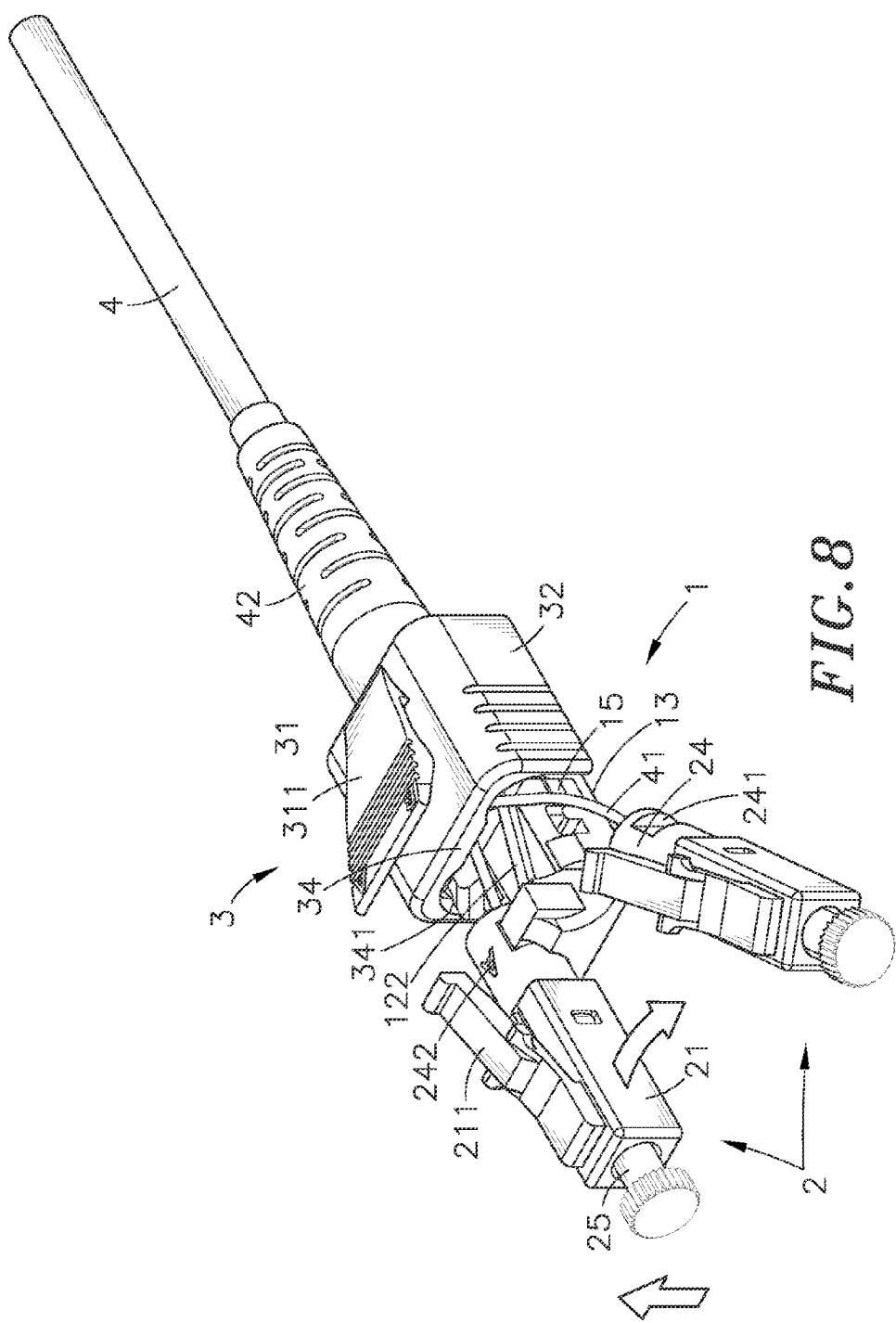
FIG. 8 is a schematic drawing illustrating exchange between the simplex connectors of the reconfigurable polarity detachable connector assembly in accordance with the present invention (II).

Referring to FIGS. 1-4, a reconfigurable polarity detachable connector assembly in accordance with the present invention is shown comprising a housing mating simplex connector 2, a sliding cap 3, and a fiber optic cable 4.

The housing 1 comprises a housing body 11 consisting of a bottom shell 111 and a top cover shell 112. The housing body 11 comprises two accommodation channels 12 arranged in a parallel manner at a front side thereof, two retaining hooks 121 respectively disposed at an outer side in each of the accommodation channels 12, a partition board 122 disposed between the two accommodation channels 12 and extending backwardly toward a rear side thereof, two sliding coupling means 13, for example, sliding grooves 131 longitudinally located on a bottom wall of the bottom shell 111 at two opposite lateral sides, an opening 1120 cut through opposing top and bottom walls of the top cover shell 112, a springy protruding member 14 transversely and obliquely suspending in the opening 1120 and defining a front stop face 141, two locating grooves 15 symmetrically and transversely obliquely disposed at two opposite lateral sides of the bottom shell 111, a mounting portion 16 backwardly extended from a rear side of the housing body 11 at the center and defining therein a through hole 161 in communication with the two accommodation channels 12.

Further, the bottom shell 111 and the top cover shell 112 are fastened together by fastening respective plug rods 1111 and plugholes 1112 at the bottom shell 111 to respective plugholes 1122 and plug rods 1121 at the top cover shell 112. Alternatively, the housing body 11 can be a single-piece design. Further, the springy protruding member 14 can be made in an arched shape having two opposite ends thereof respectively formed integral with two opposite side edges of the opening 1120.

The two mating simplex connectors 2 are respectively detachably mounted in the accommodation channels 12 of the housing 1, each comprising a hollow holder base 21, a tubular calibration support rod 22, an elastic member, for example, coil spring 23, a connection sleeve 24, and a dust cap 25. The hollow holder base 21 comprises a releasing clip 211 backwardly upwardly extended from the top wall thereof. The tubular calibration support rod 22 is positioned in the hollow holder base 21, comprising a front ceramic tube 221 and a rear tube 222. The connection sleeve 24 is fastened to a rear side of the hollow holder base 21 around the rear tube 222 of the tubular calibration support rod 22, comprising a peripheral retaining groove 241 disposed near a rear end thereof, and an index 242 located on the periphery thereof and formed of, for example, a letter, numeral or symbol. According to the present preferred embodiment, the index 242 of the connection sleeve 24 of one mating simplex connector 2 is the alphabetic letter "A", and the index 242 of the connection sleeve 24 of the other mating simplex connector 2 is the alphabetic letter "B". The coil spring 23 is sleeved onto the rear tube 222 of the tubular calibration support rod 22, having two opposite ends thereof respectively connected to the tubular calibration support rod 22 and the connection sleeve 24. The dust cap 25 is fastened to the hollow holder base 21 to protect the front ceramic tube 221 of the tubular calibration support rod 22 against outside dust.

The sliding cap 3 is capped on the housing 1, comprising a horizontal top panel 31, a latching clip 311 forwardly upwardly extended from the horizontal top panel 31, two vertical side panels 32 respectively downwardly extended from two opposite lateral sides of the horizontal top panel 31 and defining with the two vertical side panels 32 a positioning space 30, two sliding coupling means 33, for example, sliding rails 331 respectively located on the vertical side panels 32 at an inner side, and a stop flange 34 extended from a front side of the horizontal top panel 31 and disposed at a top front side of the positioning space 30.

The fiber optic cable 4 comprises two optical fiber cores 41 inserted through the through hole 161 of the mounting portion 16 into the inside of the housing 1, an outside jacket 42 surrounding the mounting portion 16 of the housing 1, and a ferrule 421 made of a metallic or plastic material and mounted inside the outside jacket 42 and affixed to the periphery of the mounting portion 16 of the housing 1.

When assembling the reconfigurable polarity detachable connector assembly, set the connection sleeves 24 of the two mating simplex connectors 2 in the accommodation channels 12 of the housing 1 to force the respective peripheral retaining grooves 241 into engagement with the respective retaining hooks 121, and then insert the fiber optic cable 4 into the through hole 161 of the mounting portion 16 of the inside of the housing 1 to force the two optical fiber cores 41 through the respective connection sleeves 24 and the rear tubes 222 of the tubular calibration support rods 22 of the respective mating simplex connectors 2 into the respective front ceramic tubes 221, and then affix the outside jacket 42 of the fiber optic cable 4 to the periphery of the mounting portion 16 of the housing 1.

Thereafter, insert the sliding rails 331 of the sliding cap 3 into the respective sliding grooves 131 of the housing body 11 of the housing 1, and then press the springy protruding member 14 to let the stop flange 34 of the sliding cap 3 be moved over the springy protruding member 14. After moved the stop flange 34 of the sliding cap 3 over the springy protruding member 14, release the pressure from the springy protruding member 14 to let respective oblique surface portions 332 of the sliding rails 331 of the sliding cap 3 be respectively engaged into respective end portions 132 of the respective sliding grooves 131 of the housing body 11 of the housing 1. At this time, the front stop face 141 of the springy protruding member 14 is stopped against the rear side of the sliding cap 3 to prohibit the sliding cap 3 from moving backwards relative to the housing 1, two arched surface portions 341 of the stop flange 34 of the sliding cap 3 are respectively abutted against the periphery of the connection sleeves 24 of the respective mating simplex connectors 2, and the latching clip 311 of the sliding cap 3 is stopped against the releasing clips 211 of the hollow holder bases 21 of the respective mating simplex connectors 2.

Referring to FIGS. 5-8, when using the reconfigurable polarity detachable connector assembly, press the springy protruding member 14 of the housing 1 toward the inside of the opening 1120 and simultaneously push the sliding cap 3 to move the sliding rails 331 along the respective sliding grooves 131 in direction toward the fiber optic cable 4, and then release pressure from the springy protruding member 14 to let the springy protruding member 14 return to its former shape and be stopped against the bottom wall of the horizontal top panel 31 of the sliding cap 3. At this time, the stop flange 34 of the sliding cap 3 is disposed above the partition board 122 and behind the locating grooves 15 of the housing body 11 and stopped at the front side of the top cover shell 112, the two arched surface portions 341 of the stop flange 34 of the sliding cap 3 are kept away from the stepped periphery of the connection sleeves 24 of the respective mating simplex connectors 2, and the two optical fiber cores 41 of the fiber optic cable 4 are kept in the accommodation channels 12 and exposed to the outside (see FIG. 7). Thereafter, lift the connection sleeve 24 of one mating simplex connector 2 that is marked with the index 242 of alphabetic letter "B" to disengage the respective peripheral retaining groove 241 from the respective retaining hook 121, and then set the optical fiber core 41 corresponding to the lifted mating simplex connector 2 in the respective locating groove 15, leaving the corresponding accommodation channel 12 in vacancy (see FIG. 8).

Figure 9:
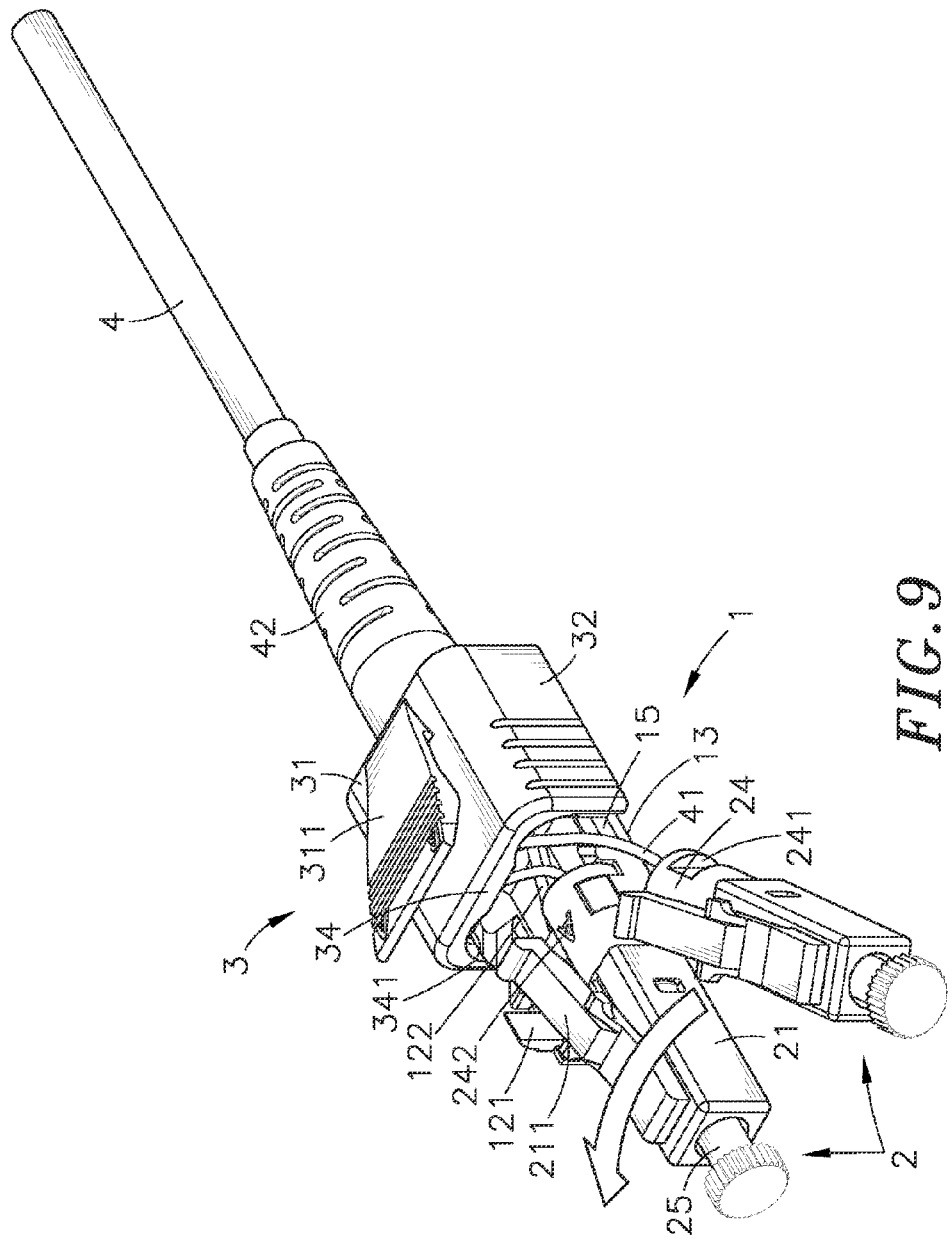
FIG. 9 is a schematic drawing illustrating exchange between the simplex connectors of the reconfigurable polarity detachable connector assembly in accordance with the present invention (III).
Figure 10:
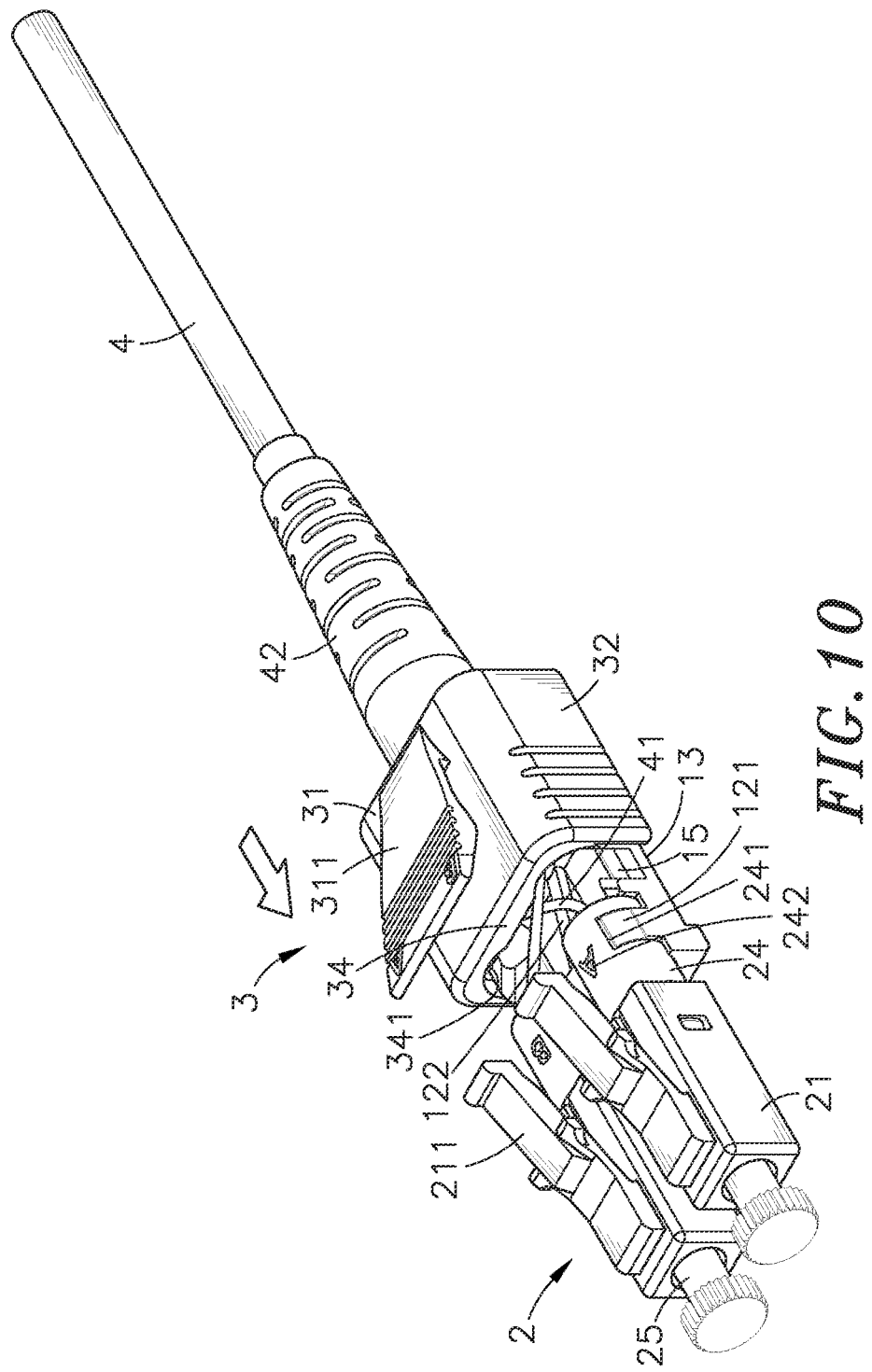
FIG. 10 is a schematic drawing illustrating exchange between the simplex connectors of the reconfigurable polarity detachable connector assembly in accordance with the present invention (IV).
Figure 11:
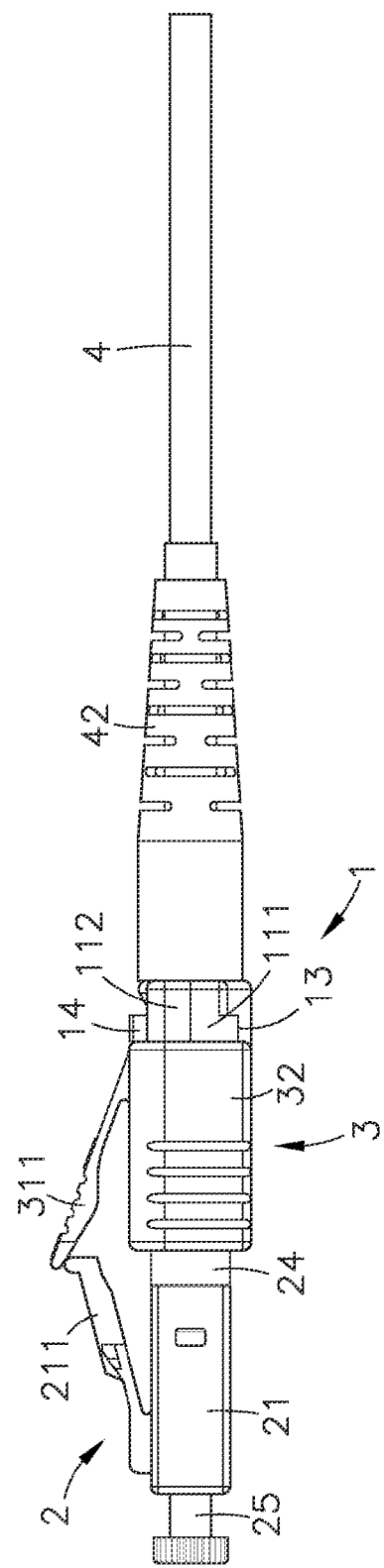
FIG. 11 is a schematic side view illustrating the sliding cap moved back to its former position after position exchange between the simplex connectors of the reconfigurable polarity detachable connector assembly in accordance with the present invention.
Figure 12:
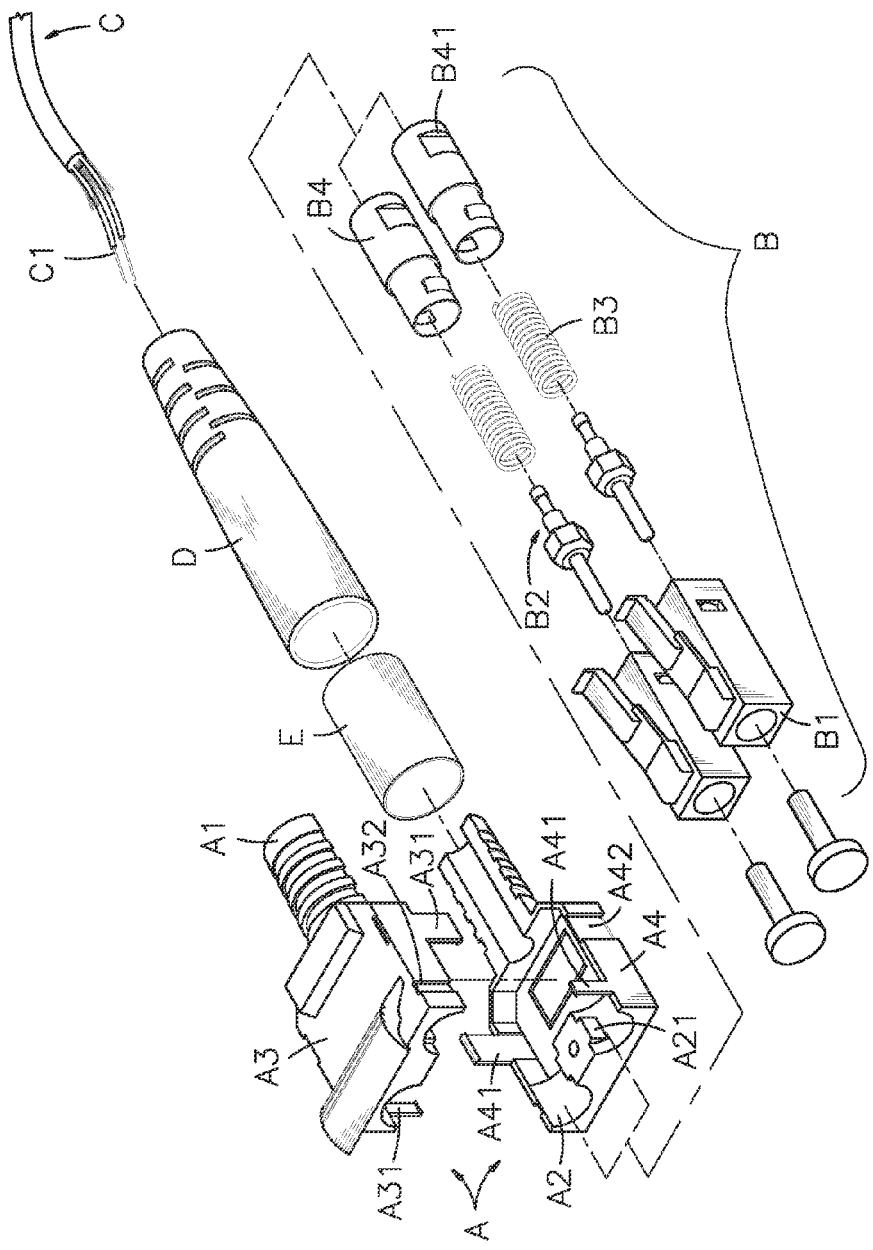
FIG. 12 is an exploded view of a duplex connector according to the prior art.

Referring to FIGS. 9-11 after one accommodation channel 12 of the housing 1 is empty, the user can lift the connection sleeve 24 of the other mating simplex connector 2 that is marked with the index 242 of alphabetic letter "A" to disengage the respective peripheral retain groove 241 from the respective retaining hook 121, and then set this duly lifted connection sleeve 24 of the other mating simplex connector 2 that is marked with the index 242 of alphabetic letter "A" into the vacant accommodation channel 12 of the housing 1 (see FIG. 9), and then lift the connection sleeve 24 of the other mating simplex connector 2 that is marked with the index 242 of alphabetic letter "B" in the respective locating groove 15 and set it into the duly vacant accommodation channel 12 (see FIG. 10) to force the respective peripheral retaining groove 241 into engagement with the respective retaining hook 121, and then push the sliding cap 3 back to its former position to close the housing 1 (see FIG. 11). Thus, the position exchange between the two mating simplex connectors 2, i.e., reconfiguration of the polarity of the optical fiber cores 41 of the fiber optic cable 4 is done.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A reconfigurable polarity detachable connector assembly, comprising:
   a housing comprising two accommodation channels extending to a front side thereof in a parallel manner, sliding coupling means bilaterally disposed at a bottom side thereof, an opening disposed at a top side thereof, and a springy protruding member suspending in said opening and partially protruding over the top side of said housing;
   two mating simplex connectors respectively detachably mounted in said accommodation channels of said housing, each said mating simplex connector comprising a hollow holder base, a tubular calibration support rod positioned in said hollow holder base, and a connection sleeve fastened to a rear side of said hollow holder base around said tubular calibration support rod and selectively detachably mountable in one said accommodation channel;
   a fiber optic cable fastened to said housing, said fiber optic cable comprising two optical fiber cores respectively inserted into the connection sleeves of said mating simplex connectors into the respective tubular calibration support rods of said mating simplex connectors; and
   a sliding cap capped on said housing and stopped at a front side of said springy protruding member of said housing, said sliding cap being movable relative to said housing between a close position to keep said optical fiber cores of said fiber optic cable from sight and an open position to expose said optical fiber cores of said fiber optic cable outside said housing after pressing of said springy protruding member into said opening by an external force, said sliding cap comprising a horizontal top panel, two vertical side panels respectively downwardly extended from two opposite lateral sides of said horizontal top panel and defining with said two vertical side panels a positioning space, sliding coupling means located on said two vertical side panels at an inner side and respectively slidably coupled to the sliding coupling means of said housing, and a stop flange extended from a front side of said horizontal top panel and disposed at a top front side of said positioning space and stoppable at a front side of said springy protruding member of said housing to hold said sliding cap in said open position after said springy protruding member being forced by an external force into said opening of said housing for allowing movement of said sliding cap by an external force from said close position to said open position.

2. The reconfigurable polarity detachable connector assembly as claimed in claim 1, wherein said housing comprises a bottom shell and a top cover shell covering a part of said bottom shell; said opening and said springy protruding member are disposed at said top cover shell; said accommodation channels are formed in said bottom shell.

3. The reconfigurable polarity detachable connector assembly as claimed in claim 1, wherein said housing further comprises two retaining hooks respectively disposed in said accommodation channels at an outer lateral side; the connection sleeve of each said mating simplex connector comprises a peripheral retaining groove engageable with one said retaining hook.

4. The reconfigurable polarity detachable connector assembly as claimed in claim 1, wherein the sliding coupling means of said housing comprises two sliding grooves bilaterally disposed at the bottom side of said housing; the sliding coupling means of said sliding cap comprises two sliding rails respectively located on said vertical side panels inside said accommodation space and respectively coupling to the sliding grooves of the sliding coupling means of said housing.

5. The reconfigurable polarity detachable connector assembly as claimed in claim 4, wherein said sliding grooves each comprise an end portion; said sliding rails each comprise an oblique surface portions engageable into the end portion of the respective sliding groove of said housing to hold said sliding cap in said close position.

6. The reconfigurable polarity detachable connector assembly as claimed in claim 1, wherein said housing comprises two locating grooves respectively disposed at two opposite lateral sides thereof and respectively outwardly extended from said accommodation channels in a perpendicular manner.

7. The reconfigurable polarity detachable connector assembly as claimed in claim 1, wherein said housing further comprise a mounting portion backwardly extended from a rear side thereof and defining therein a through hole in communication with said two accommodation channels; said fiber optic cable comprises an outside jacket surrounding optical fiber cores and said mounting portion of said housing, and a ferrule mounted inside said outside jacket and affixed to the periphery of said mounting portion of said housing.

8. The reconfigurable polarity detachable connector assembly as claimed in claim 1, wherein said springy protruding member extends in a perpendicular direction relative to the sliding direction of said sliding cap for stopping against said stop flange of said sliding cap in said open position.

9. The reconfigurable polarity detachable connector assembly as claimed in claim 8, wherein said springy protruding member comprises a front stop face adapted for stopping against said stop flange of said sliding cap to hold said sliding cap in said open position.

10. The reconfigurable polarity detachable connector assembly as claimed in claim 1, wherein the tubular calibration support rod of each said mating simplex connector comprises a front ceramic tube suspending in the associating hollow holder base and a rear tube axially backwardly extended from said front ceramic tube and positioned in the associating connection sleeve; each said mating simplex connector further comprises an elastic member mounted around the rear tube of the associating tubular calibration support rod inside the associating connection sic and stopped between the associating tubular calibration support rod and the associating connection sleeve.

11. The reconfigurable polarity detachable connector assembly as claimed in claim 1, wherein the connection sleeve of each said mating simplex connector comprises an index selected from the group of letters, numerals and symbols.

12. The reconfigurable polarity detachable connector assembly as claimed in claim 1, wherein said stop flange of said sliding cap comprises two arched surface portions respectively abutted against the periphery of the connection sleeves of said mating simplex connectors.

* * * * *